United States Patent Office 3,468,866
Patented Sept. 23, 1969

---

3,468,866
PROCESS FOR POLYMERIZING BUTADIENE IN THE PRESENCE OF REACTION PRODUCTS OF π-ALLYLIC COMPLEXES OF TRANSITION METAL AND ORGANIC ELECTRON ACCEPTORS
Alexandr Vasilievich Alferov, 7 Cheremushkinskaya ul. 7/43, korp. 130, kv. 53, Moscow, U.S.S.R.; Boris Davidovich Babitsky, Ul. Krasnogo Kursanta 7, kv. 9, Leningrad, U.S.S.R.; Tatiana Konstantinovna Vydrina, Prospekt Mira 131, kv. 19; and Boris Alexandrovich Dolgoplosk, Leninsky prospekt 61/1, kv. 70, both of Moscow, U.S.S.R.; Vitaly Abramovich Kormer, Zheleznovodskaya ul. 62, kv. 2; Vladimir Alexandrovich Krol, Avtovskaya ul. 25, kv. 9; and Mark Iosifovich Lobach, Annikov prospekt 28, kv. 52, all of Leningrad, U.S.S.R.; Evgenia Aronovna Mushina, Ul. Vavilova 36, korp. 3, kv. 3, Moscow, U.S.S.R.; Gali Alexandrovna Parfenova, Ul. Zaitseva 17/23, kv. 76; and Stepanida Trofimovna Romanova, Ul. Fontanka 104, kv. 2, both of Leningrad, U.S.S.R.; Elena Vladimirovna Sakharova, Ul. Karla Marxa 22, kv. 53; Elena Ivanovna Tinyakova, Ul. Krasikova 7/43, korp. 3, kv. 104; and Oleg Konstantinovich Sharaev, Ul. Chkalova 1/4, kv. 35, all of Moscow, U.S.S.R.
No Drawing. Filed May 26, 1967, Ser. No. 641,502
Claims priority, application U.S.S.R., June 6, 1966,
1,081,916
Int. Cl. C08d 1/32, 3/08
U.S. Cl. 260—94.3
5 Claims

ABSTRACT OF THE DISCLOSURE

A process for polymerizing butadiene under the catalytic effect of products obtained by reacting π-allylic complexes of transition metals of Groups IV–VIII of the periodic system with organic electron acceptors, the preferred catalytic systems being based on π-allylnickel halides and p-chloroanil.

---

This invention relates to a process for producing polymers of butadiene-1,3.

These polymers find wide application in the tire and rubber industries.

A process for producing polymers of butadiene-1,3 in the presence of π-allylic transition metal complexes is known (V. A. Kormer, B. D. Babitsky, M. I. Lobach, N. N. Chesnokova, International Symposium on Macromolecular Chemistry, Prague, 1965, preprint 413; E. I. Tinyakova et al., ibid., Preprint 313).

However, polymerization carried out by this method is slow. Moreover, the polymers produced are of low molecular weight and, therefore, cannot be used for producing vulcanizates with good physical properties.

It is the primary object of this invention to provide a process in which butadiene-1,3 is polymerized with suitable polymerization rates to produce high molecular weight polybutadienes.

This and other objects have been accomplished by the process comprising polymerizing 1,3-butadiene in the presence of a catalyst which consists of a π-allylic complex of a transition metal from Groups IV–VIII of the periodic table of elements and a compound selected from the group represented by the Formulas I, II, III, IV, VI:

I. 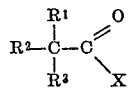

II. 
$$R^5-\overset{R^4}{\underset{R^6}{C}}-\overset{O}{\overset{\|}{C}}-\overset{R^4}{\underset{R^6}{C}}-R^5$$

III.
$$R^8-\overset{R^7}{\underset{R^9}{C}}-\overset{O}{\overset{\diagup}{C}}\diagdown O-Y$$

IV.
$$\begin{array}{c} O \\ \| \\ C \\ R^{10}-C \diagup \diagdown C-R^{12} \\ R^{11}-C \diagdown \diagup C-R^{13} \\ C \\ \| \\ O \end{array}$$

V.
$$\begin{array}{c} R^{14} \\ | \\ C \\ R^{15}-C \diagup \diagdown C=C \\ R^{16}-C \diagdown \diagup C=O \\ C \\ | \\ R^{17} \end{array}$$

VI.
$$\begin{array}{c} NO_2 \\ | \\ C \\ R^{22}-C \diagup \diagdown C-R^{18} \\ R^{21}-C \diagdown \diagup C-R^{19} \\ C \\ | \\ R^{20} \end{array}$$

wherein:
$R^1$, $R^2$, $R^3$, $R^4$, $R^5$, $R^6$, $R^7$, $R^8$ and $R^9$ are independently selected from the group consisting of hydrogen, halogen, alkyl, alkenyl, and haloalkyl groups having from 1 to 6 carbon atoms; $R^{10}$, $R^{11}$, $R^{12}$, $R^{13}$, $R^{14}$, $R^{15}$, $R^{16}$, $R^{17}$ are independently selected from the group consisting of hydrogen, halogen, cyan and alkyl groups having from 1 to 6 carbon atoms; $R^{18}$, $R^{19}$, $R^{20}$, $R^{21}$ and $R^{22}$ are independently selected from the group consisting of hydrogen, halogen, hydroxyl, cyan, nitro and alkyl groups having from 1 to 3 carbon atoms;

X is selected from the group consisting of hydrogen and halogen; and

Y is selected from the group consisting of hydrogen, metal and alkyl groups having from 1 to 4 carbon atoms.

The catalyst used for the polymerization process of the present invention can be also a reaction product of a π-allylic complex of a transition metal from Groups IV–VIII of the periodic table of elements with a compound selected from the group represented by the Formulas I, II, III, IV, V, VI.

As π-allylic complexes of transition metals from the Groups IV–VIII of the periodic table of elements use may be made of compounds selected from the group represented by Formulas VII and VIII VII. 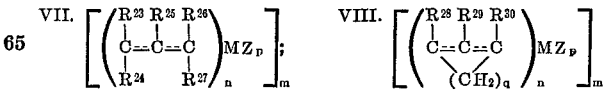

wherein $R^{23}$, $R^{24}$, $R^{25}$, $R^{26}$, $R^{27}$, $R^{28}$, $R^{29}$ and $R^{30}$ are independently selected from the group consisting of hydrogen, halogen and alkyl, alkenyl, cycloalkyl and aryl groups having from 1 to 12 carbon atoms;

Z is selected from the group consisting of halogen, cyan, thiocyan and the residue of carboxylic and halocarbonylic acids having from 1 to 18 carbon atoms;

$n$ is an integer from 1 to 3;
$p$ is an integer from 0 to 2;
$m$ is an integer from 1 to 2;
$q$ is an integer from 1 to 9.

The products obtained by reacting the π-allylic complexes of transition metals with the aforesaid organic compounds belong to the class of complexes involving charge transfer. This reaction is novel for π-allylic compounds. In the resultant complexes, electron transfer from the transition metal atom to the organic compound brings about enhanced coordination unsaturation of the metal atom, which fact is responsible for the marked catalytic activity and stereospecificity of the reaction product. To obtain the complexes of the above-mentioned type, it is preferable to employ the organic compounds represented by Formulae I–IV, insofar as said compounds contain electron acceptor groups.

The polymerization process is carried out at a temperature from −50° to +80° C. in a solution of an inert organic solvent selected from the group consisting of aliphatic, cyclo-aliphatic, aromatic hydrocarbons and halogenated derivatives thereof having from 4 to 8 carbon atoms.

The process of the present invention is carried out in the following way.

Butadiene-1,3 dissolved in an inert solvent (or without any solvent) is polymerized for a period of 0.1 to 20 hours in the presence of a small quantity of the catalyst.

A particular π-allylic metal complex is chosen depending on the desired microstructure of polybutadiene to be obtained (cis-1,4-, trans-1,4- or 1,2-content).

The catalyst components are taken in molar ratios and concentrations depending on the desired polymerization rate and molecular weight of polybutadiene to be obtained.

The polymer obtained is precipitated by any conventional procedure and is used for producing rubber compounds and vulcanizates.

Polybutadienes produced by the process of the present invention have good physical properties, good processing properties and an extremely low content of impurities which makes it possible to apply them, e.g. for electric insulation and in the food industry.

For a better understanding of the present invention by thoe skilled in this art, the following examples are given by way of illustration.

EXAMPLE 1

A 3-liter autoclave is charged with 10 ml. of bis-(π-crotyl-nickel-chloride), $(C_4H_7NiCl)_2$, solution in benzene at a concentration of 0.25 mole/liter, and 170 ml. of p-chloranil(tetrachloro-p-benzoquinone) solution, $C_6Cl_4O_2$, at a concentration of 0.03 mole/l.; and the mixture is agitataed for 0.5–1 hr. Then the autoclave is loaded with 820 ml. of benzene and 400 g. of butadiene-1,3.

Polymerization is allowed to proceed for 5 hrs. at 20° C. The yield of the polymer is 88%. The polymer has an intrinsic viscosity of $\eta=2.2$ and the following microstructure:

| | Percent |
|---|---|
| Cis-1,4-content | −96 |
| Trans-1,4-content | −2 |
| 1,2-content | −2 |

EXAMPLE 2

An autoclave is charged with 400 g. of butadiene-1,3, 10 ml. ($2.5\times10^{-3}$ mole) of bis-(π-crotyl-nickel-chloride) solution in benzene, 820 ml. of benzene and 170 ml. of p-chloranil at a concentration of 0.03 mole/l.

Polymerization carried out at 20° C. for 4 hours gives a polymer yield of 79%.

The intrinsic viscosity of the polymer is $\eta=1.9$ and the polymer has the same microstructure as the polymer in Example 1.

EXAMPLE 3

Polymerization is carried out under the same conditions as in Example 1 except that π-allylic-nickel-complexes of the general formulae given below are used instead of bis-(π-crotyl-nickel-chloride):

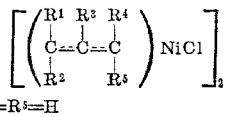

1. $R^1=R^2=R^3=R^4=R^5=H$
2. $R^1=R^2=R^4=R^5=H$     $R^3=CH_3-$
3. $R^1=R^2=R^5=H$     $R^3=R^4=CH_3-$
4. $R^2=R^3=R^5=H$     $R^1=R^4=CH_3-$
5. $R^1=R^2=R^3=R^5=H$     $R^4=CH_3-CH=CH-CH-CH_2-$
                                                                                $CH_3$

In all cases, polybutadiene of 95–96% cis-1,4-content is obtained in 60–70% yield.

EXAMPLE 4

A 100-ml. glass ampoule is charged with benzene solutions of bis-(π-crotyl-nickel-chloride) ($0.3\times10^{-3}$ mole) and cocatalysts, the latter being benzoquinone or nitrobenzene derivatives. The mixture is allowed to react for 0.5–1 hour and benzene is added so as to bring the total volume to 400 ml. and after cooling to −50° C. 7 g. of butadiene-1,3 are added.

The conditions of polymerization and results obtained are given in Table 1.

TABLE 1

| Run No. | Cocatalyst | Molar ratio cocatalyst/ $(C_4H_7NiCl)_2$ | Polymerization temperature ° C. | Polymerization time, hrs. | Polymer yield, percent | Polymer microstructure, percent Cis-1,4 | 1,2 | Trans. 1,4 |
|---|---|---|---|---|---|---|---|---|
| 1 | p-Benzoquinone | 2 | 5 | 15 | 42 | 97 | 1 | 2 |
| 2 | 3,6-di-bromo-p-benzoquinone | 2 | −15 | 20 | 33 | 98 | 1 | 1 |
| 3 | 2,3-di-chloro-5,6-dicyanobenzoquinone | 1 | 20 | 15 | 58 | 95 | 2 | 3 |
| 4 | O-chloranil (tetrachloro-o-benzoquinone) | 2 | −15 | 24 | 50 | 96 | 2 | 2 |
| 5 | Picric acid (1,3,5-trinitrophenol) | 1 | 30 | 15 | 60 | 94 | 2 | 4 |
| 6 | m-Nitrochlorobenzene | 1 | 30 | 20 | 25 | 95 | 2 | 3 |

EXAMPLE 5

The reaction mixture is prepared as in Example 4 except that the cocatalysts are halogen-substituted carbonyl- or carboxyl-containing compounds given in Table 2.

TABLE 2

| Run No. | Cocatalyst | Molar ratio cocatalyst/ $(C_4H_7NiCl)_2$ | Polymerization temperature, °C. | Polymerization time, hrs. | Polymer yield, percent | Polymer microstructure, percent | | |
|---|---|---|---|---|---|---|---|---|
| | | | | | | Cis-1,4 | 1,2 | Trans-1,4 |
| 1 | Trichloroacetaldehyde (chloral) | 4 | 20 | 2 | 80 | 95 | 2 | 3 |
| 2 | Monochloroacetic acid | 4 | 50 | 40 | 9 | 68 | 2 | 30 |
| 3 | Trichloroacetic acid | 4 | −15 | 17 | 83 | 93 | 1 | 6 |
| 4 | Trifluoroacetic acid | 1.0 | 20 | 96 | 74 | 87 | 1 | 12 |
| 5 | α,α,δ-trichlorovaleric acid | 4 | 50 | 8 | 70 | 88 | 2 | 10 |
| 6 | 4,6-dichlorobenzoic acid | 6 | 50 | 8 | 31 | 90 | 2 | 8 |
| 7 | Hexachloroacetone | 2 | −15 | 10 | 58 | 92 | 3 | 5 |

EXAMPLE 6

The reaction mixture is prepared as in Example 4 except that the cocatalysts are esters, acid chlorides and salts of halogen-substituted acids given in Table 3.

TABLE 3

| Run No. | Cocatalyst | Molar ratio cocatalyst/ $(C_4H_7NiCl)_2$ | Polymerization temperature, °C. | Polymerization time, hrs. | Polymer yield, percent | Polymer microstructure, percent | | |
|---|---|---|---|---|---|---|---|---|
| | | | | | | Cis-1,4 | 1,2 | Trans-1,4 |
| 1 | Zinc trichloroacetate | 6 | −15 | 0.5 | 90 | 92 | 2 | 6 |
| 2 | Manganous trichloro-acetate | 6 | −15 | 0.5 | 71 | 95 | 2 | 3 |
| 3 | Cobaltous trifluoro-acetate | 6 | 50 | 5 | 28 | 90 | 1 | 9 |
| 4 | Acid chloride of trichloroacetic acid | 4 | −15 | 4 | 71 | 97 | 1 | 2 |
| 5 | Ethyl-trichloroacetate | 4 | −15 | 17 | 26 | 90 | 3 | 7 |
| 6 | Methyl-α,α,γ-trichloro-butyrate | 4 | 20 | 42 | 53 | 92 | 2 | 6 |

EXAMPLE 7

Polymerization is carried out as in Example 1 except that instead of benzene, the solvents given in Table 4 are used.

TABLE 4

| Run No. | Solvent | Polymer yield, percent | Polymer microstructure, percent | | |
|---|---|---|---|---|---|
| | | | Cis-1,4 | 1,2 | Trans-1,4 |
| 1 | Heptane | 56 | 95 | 2 | 3 |
| 2 | Cyclohexane | 72 | 94 | 2 | 4 |
| 3 | Toluene | 85 | 95 | 2 | 3 |
| 4 | Chlorobenzene | 90 | 92 | 2 | 6 |

EXAMPLE 8

A 60-ml. ampoule is charged with the reaction product of $0.3 \times 10^{-3}$ mole of bis-(π-crotyl-nickel-chloride) and $0.6 \times 10^{-3}$ mole of p-chloranil and after cooling to −70° C., 20 ml. of butadiene-1,3 are added. Polymerization is carried out at +5° C. for 15 hours. The yield of the polymer is 25% and cis-1,4-content amounts to 96%.

EXAMPLE 9

A 100-ml. ampoule is charged with $0.5 \times 10^{-3}$ mole of p-chloranil (or picric acid), 60 ml. of benzene, $0.5 \times 10^{-3}$ mole of π-allylic nickel complex (see Table 5) and 14 g. of butadiene-1,3. Polymerization is carried out at 50° C. for 15 hours. The results obtained are given in Table 5.

TABLE 5

| Run No. | π-Allylic complex | Cocatalyst | Polymer yield, percent | Polymer microstructure, percent | | |
|---|---|---|---|---|---|---|
| | | | | Cis-1,4 | 1,2 | Trans-1,4 |
| 1 | Bis-(π-crotyl)nickel $(C_4H_7)_2Ni$ | p-Chloranil | 37 | 90 | 3 | 7 |
| 2 | Bis-(π-crotyl)nickel $(C_4H_7)_2Ni$ | Picric acid | 63 | 93 | 3 | 4 |
| 3 | π-Crotyl-π-cyclopentadienyl nickel $(C_4H_7NiC_5H_5)$ | Picric acid | 6 | 90 | 2 | 8 |
| 4 | π-Cyclopentyl-π-cyclopentadienyl nickel $(C_5H_7NiC_5H_5)$ | p-Chloranil | 12 | 92 | 2 | 6 |

EXAMPLE 10

Polymerization is carried out under conditions similar to those of Example 9 using π-allylic nickel complexes of the general formula $(C_4H_7NiX)_2$, where X is Br, $CH_3COO-$, $C_{17}H_{33}COO-$, CNS, $CF_3COO-$ (see Table 6).

TABLE 6

| Run No. | π-Allylic complex | Cocatalyst | Polymer yield, percent | Polymer microstructure, percent | | |
|---|---|---|---|---|---|---|
| | | | | Cis-1,4 | 1,2 | Trans-1,4 |
| 1 | Bis-(π-crotyl-nickel-bromide) $(C_4H_7NiBr)_2$ | p-Chloranil | 70 | 92 | 2 | 6 |
| 2 | Bis-(π-crotyl-nickel-bromide) $(C_4H_7NiBr)_2$ | Picric acid | 46 | 87 | 3 | 10 |
| 3 | Bis-(π-crotyl-nickel-acetate) $(C_4H_7NiOOCCH_3)_2$ | p-Chloranil | 21 | 89 | 3 | 8 |
| 4 | Bis-(π-crotyl-nickel-oleate) $(C_4H_7OOCC_{17}H_{33})_2$ | p-Chloranil | 15 | 83 | 4 | 14 |
| 5 | Bis-(π-crotyl-nickel-thiocyanide) $(C_4H_7NiCNS)_2$ | p-Chloranil | 13 | 49 | 3 | 48 |
| 6 | Bis-(π-crotyl-nickel-trifluoro-acetate) $(C_4H_7NiOOCCF_3)_2$ | p-Chloranil | 23 | 83 | 3 | 14 |

EXAMPLE 11

A 150-ml. ampoule is charged with a benzene solution of $0.25 \times 10^{-3}$ mole of dimeric bis-(π-allyl)-molybdenum, $[(C_3H_5)_2Mo]_2$, and $0.5 \times 10^{-3}$ mole of p-chloranil. Then benzene is added so as to bring the total volume to 80 ml. and after cooling the ampoule to $-70°$ C., 0.24 mole of butadiene-1,3 is added. Polymerization carried out at room temperature for 3 hours gives a polymer yield of 15%; the intrinsic viscosity of the polymer is 7.65 and the glass transition temperature is $-19°$ C., which corresponds to 95–100% 1,2-content.

EXAMPLE 12

Polymerization is carried out as in Example 11, except that p-quinone is used instead of p-chloranil. The polymer obtained has the same characteristics as the polymer in Example 11.

EXAMPLE 13

A 100-ml. ampoule is charged with the reaction product of $0.15 \times 10^{-3}$ mole of bis-(π-crotyl)-cobalt-iodide and $0.15 \times 10^{-3}$ mole of p-chloranil, 40 ml. of benzene and 20 ml. of butadiene-1,3. Polymerization is carried out at 5° C. for 15 hours. The polymer yield is 65% and the cis-1,4-content is over 96%.

We claim:

1. A process for producing polybutadienes, said process comprising polymerizing butadiene-1,3 in the presence of a catalyst which is a product obtained by reacting a π-allylic complex of a transition metal of Groups IV–VIII of the Periodic Table with an electron acceptor selected from the group consisting of compounds represented by the Formulae I, II, III, IV, V and VI:

I. 

II. 

III. 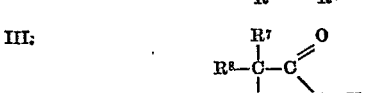

IV. 

V. 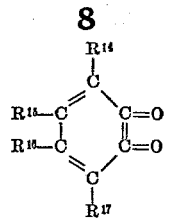

VI. 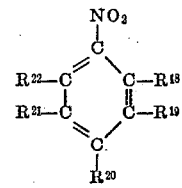

wherein $R^1$, $R^2$, $R^3$, $R^4$, $R^5$, $R^6$, $R^7$, $R^8$ and $R^9$ and are independently selected from the group consisting of hydrogen, halogen; and alkyl, alkenyl, and haloalkyl groups having from 1 to 6 carbon atoms;

$R^{10}$, $R^{11}$, $R^{12}$, $R^{13}$, $R^{14}$, $R^{15}$, $R^{16}$ and $R^{17}$ are independently selected from the group consisting of hydrogen, halogen, cyan and alkyl groups having from 1 to 6 carbon atoms;

$R^{18}$, $R^{19}$, $R^{20}$, $R^{21}$ and $R^{22}$ are independently selected from the group consisting of hydrogen, halogen, hydroxyl, cyan, nitro and alkyl groups having from 1 to 3 carbon atoms;

X is selected from the group consisting of hydrogen and halogen; and

Y is selected from the group consisting of hydrogen, metal and alkyl groups having from 1 to 4 carbon atoms.

2. A process according to claim 1 wherein the π-allylic complex of a transition metal of Groups IV–VII of the Periodic Table is a compound selected from the group represented by the Formulae VII and VIII:

VII. 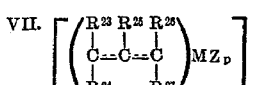   VIII. 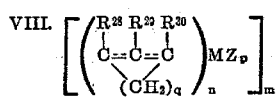

wherein $R^{23}$, $R^{24}$, $R^{25}$, $R^{26}$, $R^{27}$, $R^{28}$, $R^{29}$ and $R^{30}$ are selected from the group consisting of hydrogen, halogen and alkyl, alkenyl, cycloalkyl aryl and groups having from 1 to 12 carbon atoms;

Z is selected from the group consisting of halgen, cyan, thiocyan, and the residue of carboxylic and halocarboxylic acids having from 1 to 18 carbon atoms;

n is an integer from 1 to 3; and p is an integer from 0 to 2;

m is an integer from 1 to 2;

q is an integer from 1 to 9.

3. A process according to claim 1 wherein the polymerization is carried out at a temperature ranging from $-50°$ to $+80°$ C. in a medium of an inert organic solvent selected from the group consisting of aliphatic, cycloaliphatic, aromatic hydrocarbons and halogen derivatives thereof having from 1 to 8 carbon atoms.

4. A process according to claim 1, wherein said product is formed in the presence of the butadiene-1,3 monomer.

5. A butadiene polymerization catalyst which is a product obtained by reacting a π-allylic complex of a transition metal of Groups IV–VIII of the Periodic Table with an electron acceptor selected from the group consisting of compounds represented by the Formulae I, II, III, IV, V and VI:

I. 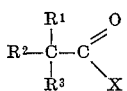

II. 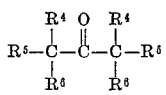

III. 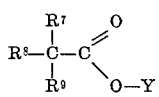

IV. 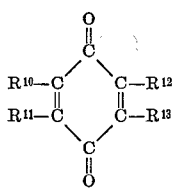

V. 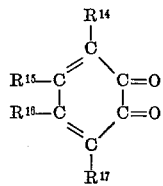

VI. 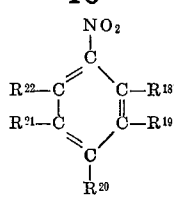

wherein $R^1$, $R^2$, $R^3$, $R^4$, $R^5$, $R^6$, $R^7$, $R^8$ and $R^9$ are independently selected from the group consisting of hydrogen, halogen; and alkyl, alkenyl, and haloalkyl groups having from 1 to 6 carbon atoms;

$R^{10}$, $R^{11}$, $R^{12}$, $R^{13}$, $R^{14}$, $R^{15}$, $R^{16}$ and $R^{17}$ are independently selected from the group consisting of hydrogen, halogen, cyan, and alkyl groups having from 1 to 6 carbon atoms;

$R^{18}$, $R^{19}$, $R^{20}$, $R^{21}$ and $R^{22}$ are independently selected from the group consisting of hydrogen, halogen, hydroxyl, cyan, nitro and alkyl groups having from 1 to 3 carbon atoms;

X is selected from the group consisting of hydrogen and halogen; and

Y is selected from the group consisting of hydrogen, metal and alkyl groups having from 1 to 4 carbon atoms.

References Cited
UNITED STATES PATENTS

| | | | |
|---|---|---|---|
| 2,898,329 | 8/1959 | Kittelson | 260—94.9 |
| 2,965,627 | 12/1960 | Field et al. | 260—94.9 |
| 3,045,001 | 7/1962 | Berger | 260—93.5 |
| 2,881,156 | 4/1959 | Pilar et al. | 260—94.9 |
| 3,046,265 | 7/1962 | Hazen et al. | 260—94.3 |
| 3,163,611 | 12/1964 | Andersen, et al. | 252—429 |
| 3,379,706 | 4/1968 | Wilke | 260—94.3 |

JOSEPH L. SCHOFER, Primary Examiner

R. A. GAITHER, Assistant Examiner

U.S. Cl. X.R.
252—431, 438, 441

Notice of Adverse Decision in Interference

In Interference No. 98,371, involving Patent No. 3,468,866, A. V. Alferov, B. D. Babitsky, T. K. Vydrina, B. A. Dolgopolsk, V. A. Kormer, V. A. Krol, M. I. Lobach, E. A. Mushina, G. A. Parfenova, S. T. Romanova, E. V. Sakharova, E. I. Tinyakova and O. K. Sharaev, PROCESS FOR POLYMERIZING BUTADIENE IN THE PRESENCE OF REACTION PRODUCTS OF $\pi$-ALLYLIC COMPLEXES OF TRANSITION METAL AND ORGANIC ELECTRON ACCEPTORS, final judgment adverse to the patentees was rendered Nov. 5, 1975, as to claims 1, 2, 3, 4 and 5.

[*Official Gazette May 3, 1977.*]